United States Patent [19]

Muccitelli

[11] 4,279,767

[45] Jul. 21, 1981

[54] USE OF IMPROVED HYDROQUINONE OXYGEN SCAVENGER IN AQUEOUS MEDIUMS

[75] Inventor: John A. Muccitelli, Feasterville, Pa.

[73] Assignee: Betz Laboratories, Inc., Trevose, Pa.

[21] Appl. No.: 168,983

[22] Filed: Jul. 14, 1980

[51] Int. Cl.³ ............................ C02F 1/20; C02F 1/58; C09K 15/08; C09K 15/20

[52] U.S. Cl. .................................... 252/178; 210/749; 252/392; 252/393; 422/13; 422/14; 422/15; 422/16

[58] Field of Search ............... 252/178, 390, 392, 393, 252/401, 404; 422/13, 14, 16, 15; 430/438, 466, 484, 485, 487; 210/59

[56] References Cited

U.S. PATENT DOCUMENTS

| 2,580,923 | 1/1952 | Jacoby | 252/180 |
|---|---|---|---|
| 3,551,349 | 12/1970 | Kallfass | 252/392 |
| 3,552,969 | 1/1971 | Henn | 430/438 |
| 3,764,548 | 10/1973 | Redmore | 252/188 |
| 3,843,547 | 10/1974 | Kaufman | 252/184 |
| 3,983,048 | 9/1976 | Schiessl | 252/178 |
| 4,019,859 | 4/1977 | Lavin | 252/178 |
| 4,172,728 | 10/1979 | Sincius | 430/478 |
| 4,192,844 | 3/1980 | Trace | 422/11 |

FOREIGN PATENT DOCUMENTS

| 2261478 | 6/1973 | Fed. Rep. of Germany | 430/485 |
|---|---|---|---|
| 958678 | 5/1964 | United Kingdom | 430/466 |

Primary Examiner—Dennis L. Albrecht
Attorney, Agent, or Firm—Alexander D. Ricci; Bruce E. Peacock

[57] ABSTRACT

An improved oxygen scavenger for aqueous mediums is disclosed which comprises hydrazine-free solution of hydroquinone and mu-amine.

14 Claims, No Drawings

USE OF IMPROVED HYDROQUINONE OXYGEN SCAVENGER IN AQUEOUS MEDIUMS

TECHNICAL FIELD

From a corrosion point of view, the presence of certain dissolved gases, even in small amounts, is undesirable in water systems which contact metal surfaces. For example, metal surfaces in contact with oxygen-containing industrial water can experience severe pitting. Pitting is highly concentrated corrosion affecting only a small area of the total metal surfaces. This can, however, be a serious problem causing metal failure even though only a small amount of metal is lost and the overall corrosion rate is relatively low.

With respect to oxygen, the severity of attack will depend on the concentration of dissolved oxygen in the water, water pH and temperature. As water temperature increases, as for example in a water heating system, enough driving force is added to the corrosion reaction that small amounts of dissolved oxygen in the water can cause serious problems. Oxygen pitting is considered to be a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration with steam as the purge gas. According to the pressure deaeration method for preparing boiler feedwater, the water is sprayed into a steam atmosphere and is heated to a temperature at which the solubility of oxygen in the water is low. About 90 to 95 percent of the oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is often required.

For boilers below 1000 pounds per square inch (psi), catalyzed sodium sulfite is used as an oxygen scavenger for the chemical deaeration of the feedwater. This chemical's oxygen scavenging property is illustrated by the reaction:

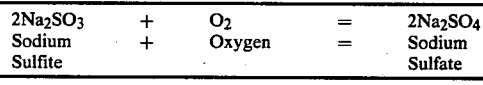

The oxygen-sulfite reaction can be effectively catalyzed by iron, copper, cobalt, nickel and/or manganese. While the sodium sulfite oxygen scavenger is often used with success, this material still has its limitations. At boiler operating pressures of 900 to 1000 psi and above, increased dissolved solids from the sulfite-oxygen reaction product can become a significant problem. Also, at high pressures the sulfite decomposes in the boiler to form sulfur dioxide and hydrogen sulfide, both of which can cause corrosion in the return condensate system.

Hydrazine is also used as an oxygen scavenger according to the reaction:

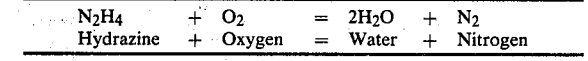

This chemical does not have the above-noted high pressure limitations of sodium sulfite. For example, since the products of the hydrazine-oxygen reaction are water and nitrogen, no solids are added to the boiler water. Hydrazine as an oxygen scavenger does, however, have its own limitations. A major problem relates to its extreme toxicity and carcinogenicity. Also, the hydrazine-oxygen reaction is very slow at low temperatures which might be encountered such as at room temperature. Above 400° F., hydrazine also decomposes according to:

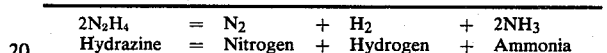

The ammonia decomposition product can be aggressive to copper or the copper-bearing metallurgies that are found in condensate systems.

In a recent development, the use of certain compounds, which are dioxo aromatic compounds or organically substituted derivative thereof, as oxygen scavengers in oxygen-containing aqueous mediums was dissolved. The group "dioxo aromatic" consists of benzoquinone, naphthoquinone, hydroquinone and catechol. The phrase "organically substituted derivative thereof" includes any dioxo aromatic compound having an organic substituent with a carbon atom attached directly to the aromatic ring. An example of such a derivative is 4-tert-butylcatechol. The use of quinones and diols as catalysts for the hydrazine-oxygen reaction in an aqueous medium is well known as evidenced, for example, by U.S. Pat. No. 3,551,349 to Kallfass. Also for example, U.S. Pat. No. 3,843,547 to Kaufman discloses the use in combination of an aryl amine compound and a quinone compound as a catalyst for hydrazine oxygen scavenger.

Indeed, in the context of this prior art, wherein the use of quinones as catalysts for hydrazine oxygen scavengers is well known, the discovery that dioxo aromatic compounds or organically substituted derivatives thereof performed very well alone as oxygen scavengers was seen to be quite unexpected. Expressed another way, it was unexpectedly found that hydrazine-free aqueous solution of dioxo aromatic compound or organically substituted derivative thereof is quite effective as an oxygen scavenger in oxygen-containing aqueous mediums. Not only are these compounds less toxic than hydrazine, but they also demonstrated significantly greater reactivity at room temperature. In addition, preliminary testing has indicated that these compounds are stable to higher temperatures than is hydrazine. This discovery is described in detail in U.S. patent applications Ser. No. 144,723 and 144,725, both filed Apr. 28, 1980, which applications are incorporated hereby by reference.

From at least a product marketing point of view, it is most desirable to provide a treatment which can be sold and utilized in a single drum (one-barrel treatment). For obvious reasons, it is easier to treat a water system from a single drum than it would be from two or more drums. For example, the feeding system for a one-barrel treatment would be simpler than that for a two-barrel treatment.

With this objective in mind, it has been common in the past to combine oxygen scavenger for treating boiler feedwater with neutralizing amine for treating the steam condensate system of the boiler. Neutralizing amines are typically used in boiler systems to neutralize carbon dioxide in the condensed steam of the condensate system. This carbon dioxide is produced from the presence of carbonate or bicarbonate alkalinity in the boiler feedwater. Most deaerated boiler feedwater will contain alkalinity that undergoes decomposition at the higher temperature boiler operating conditions, releasing carbon dioxide with the steam. The most commonly used neutralizing amines for combining with oxygen scavenger have been morpholine and cyclohexylamine.

U.S. Pat. No. 4,192,844 discloses the use of methoxypropylamine neutralizing agent in combination with hydrazine to prevent corrosion in steam condensate systems.

DESCRIPTION OF THE INVENTION

To provide convenient single-drum treatments, it was decided to test-formulate various dioxo aromatic compounds with neutralizing amines. Quite unexpectedly, when the present inventor attempted to combine the two most commonly used neutralizing amines, morpholine and cyclohexylamine, with hydroquinone, they precipitated out of solution. Upon further investigation it was discovered that while some additional amines precipitated out, others did not. In fact, testing with closely related amines yielded quite unexpected results. For example, while sec-butylamine proved to be compatible with hydroquinone in solution, the addition of tert-butylamine to hydroquine yielded an insoluble mass. Preliminary additional testing indicates that each dioxo aromatic compound has its own peculiar set of compatible neutralizing amines.

Those neutralizing amines which were found to be compatible with hydroquinone did not fall within any readily discernible chemical class. Accordingly, those amines which are compatible with hydroquinone for purposes of oxygen scavenging shall hereinafter be classified "mu-amines." As will be described below in more detail, the present inventor has developed a simple test by which the artisan can readily discern which neutralizing amines are mu-amines.

The present invention, then, is drawn to hydrazine-free oxygen scavenger treatments for oxygen-containing aqueous mediums, which treatments comprise stable solutions of hydroquinone and mu-amines. Hydroquinone alone as an oxygen scavenger has relatively low solubility in water of about 7%. Not only did the addition of mu-amine to the hydroquinone increase the solubility of the latter compound in water, but is also increased the oxygen scavenging activity thereof in aqueous mediums. For example, by the addition of an equal part of aminomethylpropanol to aqueous hydroquinone, the solubility of the hydroquinone was increased to 13%. Some problems with using incompatible amines in combination with hydroquinone are that the resulting precipitate makes product handleability a most difficult problem and less hydroquinone is available for use in treating an oxygen corrosion problem. Stable compositions in accordance with the present invention, accordingly, do not possess handleability problems (e.g. pumpability) or contain amounts of precipitate which significantly reduce the amount of available hydroquinone (greater than 1% reduction in hydroquinone concentration, e.g., from 10% to 9%).

Compositions in accordance with the present invention comprise stable, hydrazine-free solutions of hydroquinone and mu-amine. As the amount of hydroquinone in this solution increases, the viscosity of the solution also increases with a corresponding decrease in product handleability. Since water will decrease the viscosity of such solutions, the presence of water therein is preferred. As the amount of hydroquinone in solution increases, the amount of water therein should also be increased until the desired handleability is realized.

Experimental data has indicated that there is a definite upper solubility limit for hydroquinone in the solution, regardless of the presence or absence of water. This limit appears to be about 45% hydroquinone on a weight basis. For example, in a two-component solution in accordance with the present invention, the upper solubility limit for hydroquinone would be about 45% of the total amount of hydroquinone and mu-amine (weight basis). When water is present, the upper solubility limit for hydroquinone would be about 45% of the total amount of hydroquinone, mu-amine and water. Accordingly, stable treatment compositions in accordance with the present invention would comprise about 45% or less of hydroquinone. The preferred hydroquinone concentration would be about 5% to 30%, with about 10% to 20% being most preferred. Based on experimental data, there is seen to be no practical upper concentration limit for the mu-amine.

When making or using a two-component treatment in accordance with the present invention, that is, hydroquinone in combination with mu-amine, the ratio of hydroquinone to mu-amine should be about 1:1.3 or less (weight basis), e.g., 1:1.7, 1:1.8, etc. When making or using an aqueous solution of hydroquinone and mu-amine in accordance with the present invention, the ratio of hydroquinone to mu-amine will depend on the total amount of hydroquinone (weight basis) in solution. If the hydroquinone concentration is less than 7%, below the solubility limit for hydroquinone in water, any ratio of hydroquinone to amine would be suitable. In such instances, even though the mu-amine wouldn't be necessary to overcome hydroquinone-solubility problems, it would still, nonetheless, increase the oxygen scavenging efficacy of the hydroquinone. When the hydroquinone concentration in aqueous solution exceeds 7%, the ratio of hydroquinone to mu-amine should be about 7:1 or less. According to the results of experiments conducted by the present inventor, compositions in which the ratio of hydroquinone to mu-amine ranged from about 7:1 to 1:99 proved to be effective for oxygen scavenging. The preferred range for this ratio is about 5:1 to 1:10.

The amount of treatment added could vary over a wide range and would depend on such known factors as the nature and severity of the problem being treated. Based on experimental data, it is believed that the minimum amount of treatment composition could be about 0.01 total parts of active hydroquinone and mu-amine per million parts of aqueous medium being treated. The preferred minimum is about 0.1 parts per million. Also based on experimental data, it is believed that the maximum amount of active treatment composition could be about 10,000 ppm. The preferred maximum is about 100 ppm.

Because it was the best hydroquinone solubilizer and the most thermally stable of the amines tested, methoxypropylamine is the most preferred mu-amine. The preferred ratio of hydroquinone to methoxypropylamine is about 1:1.

The reactivity of hydroquinone with oxygen will depend on such factors as treatment concentration and water temperature and pH. In general aqueous systems where the treatment does not have the benefit of elevated water temperature, it is preferred that the water be of alkaline pH, e.g., greater than about 7.5. A pH of 9.0 or greater is most preferred. Otherwise, even though overfeeding the treatment might perform the necessary oxygen scavenging, economics would make such an approach undesirable. In treating boiler feedwater, it is preferred that once the water reaches the boiler proper, it has an alkaline pH, which is always the case for boilers operating within the ASME guidelines.

In treating boiler feedwater, it is a well known fact that oxygen can get into the boiler from other sources. Accordingly, in keeping with standard practices for treating boiler feedwater, an excess amount of hydroquinone should be used to provide a residual amount thereof in the boiler water for the uptake of oxygen from other sources. It is also contemplated that the oxygen scavenger composition of the present invention could be used directly in the condensate system when condensed steam was experienced oxygen contamination.

Following are Examples 1-5 from U.S. Application Ser. No. 144,725, which are substantially reproduced to point out the significance of the discovery that hydroquinone alone is effective as an oxygen scavenger.

EXAMPLE 1

In a first series of tests, the oxygen scavenging efficacies of various materials were evaluated under conditions of elevated temperature and pressure. The test apparatus used was essentially a stainless steel hot water flow system equipped with appropriate monitoring instrumentation. Demineralized feedwater, adjusted to the appropriate pH and initial dissolved oxygen level (controlled by nitrogen sparging), was pumped from a reservoir at ambient temperature into a once-through heater. Temperature was monitored continuously by means of thermocouples at several locations along the length of the flow tubing. A solution containing the oxygen scavenger test material was loaded into a pump driven syringe and fed continuously to the heated flow stream through a port containing a stainless steel ribbon mixing baffle. The feedwater containing dissolved oxygen and the test material then traversed the flow tubing via a by-pass comprising an additional length of coiled tubing. Contact (or reaction) time of the test material and dissolved oxygen was governed by the choice of coil length. The tendency of the temperature to drop during residence in the coiled tubing was offset by the use of thermostatted heating tapes which maintained the temperature in this tubing at 78°±3° C. Upon exiting the coiled tubing, the stream flowed through a sample cooler to render the temperature of the liquid compatible with the operating range of a membrane-type dissolved oxygen probe. The cooled liquid was analyzed for dissolved oxygen via a D.O. flow cell, and pH was potentiometrically monitored in the flow tube immediately downstream of the D.O. probe. Outputs of the temperature, pH and dissolved oxygen probes during operation were monitored via strip chart recorders. The final destination of the reaction mixture was a reservoir which could be drained for analysis of reaction products, if desired.

A suitable set of operating conditions were found which were not extremely different from those experienced in boiler feedwater systems and which did not result in appreciable experimental uncertainties. A flow rate of 300 ml/min. through the apparatus was chosen, since this yielded the optimum response of the dissolved oxygen probe. Temperature in the system would be maintained at 78°±3° C. under 4±1 psig. Residence time of the feedwater in the flow tube from chemical feed point to D.O. flow cell outlet was 4±0.2 minutes. Approximately 3.5 minutes of this total was spent in a 40' length of 0.402 inch i.d. coiled tubing. Entry into and residence in the sample cooler accounted for 0.5 minute of the total contact time.

According to an article by J. W. Cohn and R. E. Powell, Jr., J. Amer. Chem. Soc., 76, 2568 (1954), hydrazine exhibits maximum oxygen scavenging efficacy in solution between pH 10.0-10.5. Accordingly, to provide a comparison of hydroquinone with hydrazine the tests were performed in water with a pH in the range of 10.0-10.5.

The test solutions were prepared by initially mixing 10 grams of test material and 90 grams of demineralized water in glass bottles and allowing the mixture to remain in a shaker for several hours. If complete dissolution for a given material was observed after shaking, the pH of the solution was measured. When the pH of the solution was below 10.0, 7 N sodium hydroxide was added dropwise until this value was reached. The quantity of added sodium hydroxide was recorded and later used in corrections for the active concentration of the solution. When the pH value of a stock solution was above pH 10.0 without requiring the addition of caustic, the solution was not further modified.

Results of these tests are reported in TABLE 1 below in terms of percent oxygen removed from the test stream. The precision of the initial and final dissolved oxygen values reported is approximately ±10%. Accordingly, values reported for percent oxygen removal which are below 20% may represent experimental artifacts. The experimental uncertainties decrease with increasing values of percent dissolved oxygen removal.

TABLE 1

| Material | Stock[1] Solution Concentration (%) | Feedwater Concentration (ppm) | Feedwater pH[2] | Initial $O_2$ (ppm) | % $O_2$ Removed |
|---|---|---|---|---|---|
| hydrazine | 10.0 | 96 ± 8[3] | 10.3 ± 0.1[3] | 1.8 ± 0.5[3] | 91 ± 4[3] |
| hydroquinone | 4.9 | 100 | 8.9 | 2.3 | 97 |
| p-phenylenediamine | 5.2 | 69 | 10.9 | 2.0 | 35 |
| o-phenylenediamine | 5.8 | 58 | 10.2 | 2.0 | 10 |

TABLE 1-continued

| Material | Stock[1] Solution Concentration (%) | Feedwater Concentration (ppm) | Feedwater pH[2] | Initial O$_2$ (ppm) | % O$_2$ Removed |
|---|---|---|---|---|---|
| recorcinol | 9.2 | 90 | 9.8 | 1.8 | 0 |

[1]Concentration of the stock solution used for chemical feed after the addition (if necessary) of 7N sodium hyroxide to adjust pH.
[2]These are feedwater pH values downstream of chemical feed point measured at ambient temperature.
[3]Average of 9 runs.

As can be seen from the results reported in TABLE 1, the hydroquinone was at least equivalent to, if not better than, hydrazine with respect to oxygen scavenging in the test water. Of those materials which proved to be ineffective for the purpose of oxygen scavenging o- and p- phenylenediamine and resorcinol, an aromatic meta-diol, are considered to be particularly noteworthy. These materials, although known to be antioxidants, were not considered to be effective as oxygen scavengers in the tested water system.

EXAMPLE 2

In order to compare the performance of hydroquinone with that of hydrazine under field-type conditions, a series of experiments were conducted on the feedwater of a working boiler. The test materials were fed to the deaerator storage tank, and the resultant change, if any, in dissolved oxygen level was measured on a sample flowing from the feedwater line through a membrane-type dissolved oxygen probe.

The results of these tests are reported below in TABLE 2 in terms of % oxygen removed from the boiler feedwater. During the tests, a relatively wide range of experimental conditions was encountered among the test parameters, reflecting the difficulty of attepting to obtain precise data during experiments performed on a working boiler.

In order to provide some point of reference for judging oxygen scavenging efficacies while taking into account the diverse conditions experienced on a daily basis, hydrazine control runs were performed, whenever possible, under feedwater and boiler conditions similar to those encountered during testing of other test materials. The hydrazine control runs are reported below in TABLE 3, also in terms of % oxygen removal.

TABLE 2

| Material | Feedwater Concentration (ppm Actives) | Feedwater pH | Steam Load (1000 lbs./hr.) | Feedwater[1] Initial O$_2$ (ppb) | % O$_2$ Removed |
|---|---|---|---|---|---|
| hydroquinone | 1.9 | 8.4 | 15 | 10.0 | 90 |
| hydroquinone | 1.9 | 8.4 | 15 | 8.0 | 88 |

[1]Dissolved oxygen concentration of feedwater exiting the deaerator with no chemical feed.

TABLE 3

| Hydrazine Control Run # | Feedwater[1] Concentration pH (ppm Actives) | Feedwater pH | Steam Load (1000 lbs./hr.) | Feedwater Initial O$_2$ (ppb) | % O$_2$ Removed |
|---|---|---|---|---|---|
| 1 | 1.6 | 8.8 | 11 | 13.0 | 69 |
| 2 | 1.1 | 9.4 | 15 | 4.0 | 50 |
| 3 | 1.2 | 8.6 | 15 | 6.0 | 60 |
| 4 | 1.0 | 8.8 | 15 | 5.8 | 55 |
| 5 | 0.8 | 9.4 | 11 | 3.5 | 31 |
| 6 | 1.6 | 9.6 | 14 | 4.0 | 30 |

[1]All hydrazine concentrations.

Based on the results reported in TABLES 2 and 3, hydroquinone was considered to be efficacious in treating boiler feedwater and compared favorably with hydrazine.

EXAMPLE 3

Presented in TABLE 4 below are data comparing the toxicity of hydrazine with hydroquinone. The data are presented in terms of oral dosage required to kill 50 percent of the test rats (LD50 Oral Rat) and are available in the National Institute for Occupational Safety and Health "Registry of Toxic Effects of Chemical Substances", HEW Publication No. (NIOSH) 76-191 (1976).

TABLE 4

| Material | LD50 Oral Rat (mg/Kg) |
|---|---|
| hydrazine | 60 |
| hydroquinone | 320 |

Based on the data presented in TABLE 4, it can be seen that hydroquinone is significantly less toxic as compared to hydrazine.

EXAMPLE 4

In a further series of tests, the low (room) temperature reactivity with oxygen of hydroquinone was compared to that of hydrazine. The test apparatus basically consisted of a 1 liter, three-necked flask fitted with a dissolved oxygen probe and a pH electrode. The intent of this apparatus was to show reaction kinetics differences rather than precise measurements (within seconds) of reaction times.

The flask was filled with deionized water which had been stripped of some dissolved oxygen by bubbling nitrogen through a diffuser stone. The pH was adjusted to the desired level with sodium hydroxide. The flask was sealed with a rubber septum, the dissolved oxygen probe and the pH electrode. A magnetic stirrer bar was left in the flask for mixing. The mixer was turned on, and dissolved oxygen and temperature readings were recorded until the dissolved oxygen reached a constant value. Next, the appropriate quantity of additive was injected through the septum using a hypodermic syringe. The initial mole ratio of treatment to dissolved oxygen was determined by weighing feed chemical and measuring the oxygen concentration. The volume displacement was effected through a capillary at the top of the probe which did not affect the dissolved oxygen in the flask. Dissolved oxygen and temperature readings were then taken at appropriate time intervals.

The results of these tests are provided below in TABLE 5 in terms of relative amounts of % oxygen removed at the time intervals indicated (1 and 5 minutes). As can be seen in the table, no measurement was made for hydroquinone at the 5 minute interval.

TABLE 5

| Material | pH | Temperature (°C.) | Moles of Treatment Mole of $O_2$ | Initial $O_2$ (ppm) | % $O_2$ Removed 1 minute | 5 Minutes |
|---|---|---|---|---|---|---|
| hydroquinone | 8.6 | 22.5 | 0.94 | 7.7 | 29 | — |
| hydrazine | 9.2 | 26.5 | 10.5 | 0.87 | 1 | 2 |

These results are seen to demonstrate the superiority of hydroquinone, as compared to hydrazine, with respect to reactivity at low temperature with oxygen. The low amount of dissolved oxygen used in the hydrazine test was compensated for by using a very large stoichiometric excess (greater than 10 moles of hydrazine to 1 mole of oxygen) of treatment.

EXAMPLE 5

Due to the presence of the aromatic ring in hydroquinone, it is believed that this compound has greater thermal stability than hydrazine. To confirm this, thermal decomposition studies for hydrazine and hydroquinone were performed on aqueous solutions of the materials in autoclaves. The aqueous solutions (approximately 50–60 ppm in demineralized water) were subjected to specified temperature and pressure conditions for 4 hours prior to chemical analysis. The results are reported below in TABLE 6 in terms of percent decomposition for the temperature and pressure conditions specified.

TABLE 6

| Hydroquinone (54 ppm) | | | Hydrozine (60 ppm) | | |
|---|---|---|---|---|---|
| Pressure (psig) | Temperature (°F.) | % Decomposition | Pressure (psig) | Temperature (°F.) | % Decomposition |
| 0 | 70 | 0 | 0 | 70 | 0 |
| 500 | 468 | 0 | 435 | 450 | 20 |
| 1000 | 545 | 33 | 1100 | 550 | 52 |
| 1500 | 597 | 54 | 1620 | 600 | 79 |
| 2000 | 636 | 81 | 2000 | 636 | 93 |

These results are seen to clearly demonstrate the superior thermal stability of the hydroquinone as compared to that of hydrazine.

EXAMPLE 6

A simple test has been developed for identification of those amines which are suitable for stable oxygen scavenger formulations with hydroquinone, that is, mu-amines. The steps of this test are as follows:

Step 1: To a 1 pint glass jar which can be equipped with a cover lid add 80.0 grams of demineralized water and 10.0 grams of the amine to be tested.

Step 2: Stir the contents of the jar for one minute, preferably via a magnetic stirrer. If the amine is a solid, stir until complete dissolution into the water is attained.

Step 3: To the contents of the jar, after the amine has been thoroughly mixed with the water, add 10.0 grams of hydroquinone.

Step 4: Stir the contents of the jar for three minutes. If precipitation within the jar occurs, then the amine is not a mu-amine. If no precipitate formation within the jar is evident, the amine may possibly be a mu-amine, so proceed to Step 5.

Step 5: Seal the jar and stir vigorously for seven minutes.

Step 6: After stirring, filter the contents of the jar through a 5 micron filter paper via suction. If a non-filterable and/or insoluble mass remains on the filter paper (not merely discoloration of the paper) after filtration, or if an insoluble mass clings to the interior of the jar, then the amine is not a mu-amine. If the contents of the jar pass unhindered through the filter paper, the amine may possibly be a mu-amine and Steps 7 and 8 should be performed.

Step 7: Remove a 1.0 ml aliquot from the filtration flask or receiver (i.e., an aliquot of the former jar contents) with a syringe.

Step 8: Inject the contents of the syringe into the room temperature oxygen scavenger apparatus described in Example 4 above which contains air-saturated, demineralized water and sufficient sodium hydroxide to result in a pH 9–10 range in the reaction flask. If at least 70% of the dissolved oxygen initially present in the air-saturated water is removed within one minute after injection, the amine is definitely a mu-amine. If at least 70% of the dissolved oxygen is not removed within one minute, then the amine is not a mu-amine.

Reported below in Table 7 are the results of tests using the above described procedure for various amines. An asterisk (*) in a column indicates a positive result.

TABLE 7

| | Results Upon Completion Of Indicated Step | | | | | |
|---|---|---|---|---|---|---|
| | 4 | | 6 | | 8 | |
| Amine | Not mu-Amine | Possible mu-Amine | Not mu-Amine | Possible mu-Amine | Not mu-Amine | Definite mu-Amine |
| Aminomethylpropanol | — | * | — | * | — | * |
| Triethylenetetramine | — | * | — | * | — | * |
| Diisopropanolamine | — | * | — | * | — | * |
| Morpholine | * | — | — | — | — | — |
| sec-Butylamine | — | : | — | * | — | * |
| tert-Butylamine | * | — | — | — | — | — |
| Monoisopropanolamine | — | * | — | * | — | * |
| Ethylenediamine | — | * | — | * | — | * |
| Hexamethylenediamine | * | — | — | — | — | — |
| Triethylenediamine | * | — | — | — | — | — |
| Dimethylaminopropylamine | — | * | — | * | — | * |
| Monoethanolamine | — | * | — | * | — | * |
| Dimethyl(iso)propanolamine | — | * | — | * | — | * |
| Cyclohexylamine | * | — | — | — | — | — |
| Methoxypropylamine | — | * | — | * | — | * |
| Diethylaminoethanol | — | * | — | * | — | * |

Although the results in Table 7 might indicate that Step 6 (filtration) may be unnecessary in the determination of mu-amines, it serves as a precaution against the possibility of precipitation formation or incomplete dissolution being undetected due to a dark color which may form during mixing.

EXAMPLE 7

Using the same apparatus and procedure as described in Example 4 above, oxygen scavenging experiments were performed by injecting 1 ml of stock solution into a glass vessel containing 1070 ml of air-saturated, demineralized water adjusted to the appropriate pH with 7 N sodium hydroxide. The results of these tests are given in Table 8 below in terms of % oxygen removal at 60 seconds. The tests were performed at ambient temperature (23°–25° C.), and the feedwater dosage was 103 parts of active hydroquinone per million parts of water and 103 parts of active mu-amine per million parts of water. The aqueous stock feed solution, on a weight basis, was 11% hydroquinone/11% amine (actives). The final pH values indicated are for the test water.

TABLE 8

| mu-amine Combined With Hydroquinone | Final pH | Initial $O_2$ (ppm) | % $O_2$ Removed |
|---|---|---|---|
| Aminomethylpropanol | 9.8 | 8.4 | 100 |
| Triethylenetetramine | 9.6 | 6.8 | 89 |
| Diisopropanolamine | 9.3 | 6.5 | 86 |
| Ethylenediamine | 9.9 | 7.0 | 85 |
| Diethylaminoethanol | 9.7 | 7.9 | 77 |
| Dimethylaminopropylamine | 10.1 | 7.0 | 76 |
| Monoethanolamine | 10.0 | 7.2 | 75 |
| sec-Butylamine | 10.5 | 6.4 | 74 |
| Dimethyl(iso)propanolamine | 9.8 | 7.6 | 73 |

As can be seen from the results in Table 8, stable solutions of hydroquinone and mu-amines demonstrated efficacy as oxygen scavengers.

EXAMPLE 8

Using the apparatus and methods described above in Example 1, additional oxygen scavenger tests for hydroquinone/mu-amine compositions were performed under conditions which were different than those for the preceding example (Example 7). The aqueous stock feed solutions used were 2.4% hydroquinone/7.2% mu-amine (active concentrations, weight basis, with demineralized water). These concentrations were chosen so that the feedwater levels during the experiments would be about 10 ppm hydroquinone and 30 ppm mu-amine (a 1:3 hydroquinone/mu-amine ratio). The specific experimental conditions were:

Temperature = 78 ± 1° C.
Pressure = 3–5 psig
Reaction Time = 240 ± 10 seconds

The results of these tests are reported below in Table 9 in terms of % oxygen removed. The initial oxygen levels are reported as parts per billion (ppb). Temperature control was more precise due to improved experimental apparatus.

TABLE 9

| mu-Amine Combined With Hydroquinone | Final pH | Initial $O_2$ (ppb) | % $O_2$ Removed |
|---|---|---|---|
| Diethylaminoethanol | 10.3 | 500 | 97 |
| Dimethyl(iso)propanolamine | 10.3 | 750 | 98 |
| Ethylenediamine | 10.3 | 500 | 99 |

In addition to these results, data were obtained for monoisopropanolamine and methoxypropylamine under a slightly different set of experimental conditions. For these experiments, the aqueous stock feed solutions were 10% hydroquinone/10% mu-amine. Experimental conditions were:

Temperature = 78 ± 1° C.
Pressure = 3–5 psig
Reaction Time = 240 ± 10 seconds
Feedwater Dosage = 6.7 ppm hydroquinone/6.7 ppm mu-amine The results are reported in Table 10 below, also in terms of % oxygen removal.

TABLE 10

| mu-Amine Combined With Hydroquinone | Final pH | Initial $O_2$ (ppm) | % $O_2$ Removed |
|---|---|---|---|
| Monoisopropanolamine | 9.7 | 1.5 | 98 |
| Methoxypropylamine | 9.7 | 1.0 | 99 |

EXAMPLE 9

Using the same procedure described in Example 7 above, additional oxygen scavenging experiments were performed at various concentrations of active compounds and various weight ratios of hydroquinone and mu-amine. The results of these tests are presented below in Table 11 in terms of % oxygen removed. The stock solution concentrations are presented in terms of weight % aqueous. The stock solutions were each 100 grams total. The dosage rates for hydroquinone were 93 ppm, while the dosage rates for the mu-amines ranged from about 14 to about 9200 ppm. The tests were conducted at ambient temperature (23°-25° C.).

TABLE 11

| mu-Amine | Concentration mu-Amine (wt. % aqueous) | Concentration Hydroquinone (wt. % aqueous) | Weight Ratio Hydroquinone: mu-Amine | Final pH | Initial O$_2$ (ppm) | % O$_2$ Removed At 60 Seconds |
|---|---|---|---|---|---|---|
| DEAE[1] | 1.5 | 10.0 | 6.67:1 | 9.6 | 8.4 | 95 |
| DEAE | 30.0 | 10.0 | 1:3 | 9.9 | 8.3 | 95 |
| DEAE | 90.0 | 10.0 | 1:9 | 9.6 | 8.4 | 95 |
| DEAE | 99.00 | 1.0 | 1:99 | 10.5 | 8.3 | 95 |
| DMAPA[2] | 1.5 | 10.0 | 6.67:1 | 9.8 | 8.3 | 94 |
| DMAPA | 30.0 | 10.0 | 1:3 | 9.8 | 8.5 | 99 |
| DMAPA | 90.0 | 10.0 | 1:9 | 10.4 | 8.2 | 98 |
| DMAPA | 99.0 | 1.0 | 1:99 | 10.3 | 8.2 | 50 |
| MOPA[3] | 1.5 | 10.0 | 6.67:1 | 9.4 | 8.0 | 96 |
| MOPA | 2.0 | 10.0 | 5:1 | 8.7 | 8.0 | 96 |
| MOPA | 3.0 | 10.0 | 3.33:1 | 8.7 | 8.0 | 96 |
| MOPA | 90.0 | 10.0 | 1:9 | 10.0 | 8.5 | 94 |
| MOPA | 15.0 | 15.0 | 1:1 | 9.4 | 7.8 | 95 |
| MOPA | 20.0 | 20.0 | 1:1 | 9.2 | 7.9 | 98 |
| MOPA | 30.0 | 30.0 | 1:1 | 9.0 | 7.8 | 98 |
| MOPA | 40.0 | 40.0 | 1:1 | 9.0 | 7.9 | 94 |
| MOPA | 99.0 | 1.0 | 1:99 | 10.7 | 8.5 | 96 |

[1] Diethylaminoethanol
[2] Dimethylaminopropylamine
[3] Methoxypropylamine

EXAMPLE 10

As already noted, one benefit of combining a mu-amine with hydroquinone is that the solubility of the latter compound in water is increased. It has also been noted that another benefit relates to increased oxygen scavenger activity of the hydroquinone. A series of additional tests have been conducted, using the procedure reported in the preceding example, to demonstrate this second benefit (increased oxygen uptake). In these tests, possible benefits resulting from increased hydroquinone solubility were prevented by simply using hydroquinone concentrations below its aqueous solubility limit of 7%. The results of these tests are reported below in Table 12 in terms of % oxygen removed at 60 seconds. The tests were conducted at ambient temperature (23°-25° C.). The dosage rates for hydroquinone ranged from about 9 ppm to 56 ppm, while the dosage rate for the mu-amine (methoxypropylamine) ranged from 0 ppm to about 56 ppm.

TABLE 12

| Concentration mu-Amine (wt. % aqueous) | Concentration Hydroquinone (wt. % aqueous) | Initial pH | Final pH | Initial O$_2$ (ppm) | % O$_2$ Removed |
|---|---|---|---|---|---|
| 0 | 6.0 | 8.5 | 7.9 | 8.7 | 27 |
| 1.0 | 6.0 | 8.4 | 8.4 | 8.7 | 78 |
| 6.0 | 6.0 | 8.1 | 9.0 | 8.8 | 93 |
| 0 | 3.0 | 8.5 | 8.0 | 8.7 | 17 |
| 3.0 | 3.0 | 8.2 | 8.9 | 8.8 | 74 |
| 0 | 1.0 | 8.2 | 8.1 | 8.8 | 9 |
| 1.0 | 1.0 | 8.1 | 8.5 | 8.8 | 10 |
| 6.0 | 1.0 | 8.4 | 9.0 | 8.5 | 17 |

These results are seen to demonstrate that the addition of mu-amine to hydroquinone increases the oxygen scavenging efficacy of the latter compound. The rate of dissolved oxygen removal increases with increasing pH. The amine was found to prevent decreases in pH which normally occur when hydroquinone is used alone.

EXAMPLE 11

A set of experiments were conducted to demonstrate various concentrations of hydroquinone attainable without precipitation or incomplete solubility. The mu-amine used was methoxypropylamine; and in all cases, it was added in an amount equal to that of the hydroquinone (i.e., 1:1 hydroquinone/methoxypropylamine solutions in demineralized water). The following 25 gram solutions were prepared and sealed in glass bottles (components listed in order of addition):

| Solution # | Wt. % Hydroquinone | Wt. % Methoxypropylamine | Wt. % Water |
|---|---|---|---|
| 1 | 50 | 50 | 0 |
| 2 | 40 | 40 | 20 |
| 3 | 30 | 30 | 40 |
| 4 | 20 | 20 | 60 |
| 5 | 15 | 15 | 70 |

These solutions were placed on a shaker for three hours, then removed and inspected for evidence of precipitation and/or incomplete dissolution. Only solution #1 exhibited incomplete dissolution. No precipitation or undissolved hydroquinone was observed in solutions #2 through #5.

The solutions were allowed to stand in the sealed glass bottles for 3 days at ambient temperature (70° F.), for 3 days at 40° F. and for 6 days at 120° F. The results after storage under each of these temperature conditions were identical to those obtained after removal from the shaker three hours after preparation, i.e., only solution #1 contained undissolved hydroquinone. There were no signs of color changes or precipitate formation in any of the other solutions.

Accordingly, it was concluded that, with respect to formulation stability under sealed storage for 12 days at various temperatures, it is possible to produce a stable, hydrazine-free aqueous solution of 1 to 1 mixture of hydroquinone and methoxypropylamine containing active concentrations of up to about 40% hydroquinone with 40% methoxypropylamine. While it may be possible to prepare formulations with higher concentrations, the practical advantages of using such concentrated solutions are not readily apparent.

During a stability study of hydroquinone and methoxypropylamine, no precipitation was observed during 6 weeks of sealed storage at 40° F., ambient and 120° F. Using a 10% hydroquinone/10% MOPA aqueous oxygen scavenger composition, an efficacy loss of only about 5% was observed in room temperature oxygen scavenging tests. This small loss in efficacy was deemed well within acceptable limits.

Another set of experiments were performed to determine the minimum quantity of MOPA necessary to prepare an aqueous 10% hydroquinone solution without the formation of precipitate or incomplete dissolution. Fifty (50) grams of each of the following solutions were prepared in glass bottles, sealed and placed on a shaker for two hours:

| Solution # | % Hydroquinone | % Methoxypropylamine | % Demineralized Water |
|---|---|---|---|
| 1 | 10 | 0.5 | 89.5 |
| 2 | 10 | 1.0 | 89.0 |
| 3 | 10 | 1.5 | 88.5 |
| 4 | 10 | 2.0 | 88.0 |
| 5 | 10 | 2.5 | 87.5 |
| 6 | 10 | 3.0 | 87.0 |
| 7 | 10 | 3.5 | 86.5 |
| 8 | 10 | 4.0 | 86.0 |

After mixing, solutions #1 through #3 exhibited incomplete dissolution of hydroquinone. After 3 days of sealed storage at ambient temperature, no changes were observed in any of the solutions. After 12 days of sealed storage at 40° F., solutions #1 through #3 exhibited formation of granular crystals, while no changes were observed for solutions #4 through #8. After 3 days of sealed storage at 120° F., all solutions (#1 through #8) exhibited complete dissolution of hydroquinone. The solutions were allowed to stand for 24 hours at ambient temperature, and all were observed to retain complete solubility.

Accordingly, it was concluded that the lowest practical MOPA concentration in the mixture is 2%.

EXAMPLE 12

Below in Table 13 are reported the results of tests conducted with 10% HQ/5% MOPA and with 10% HQ/2% MOPA in the feedwater system of a working boiler. The oxygen scavenger compositions were fed to the storage section of the deaerator after the appropriate dilution in a chemical feed tank. The deaerator temperature and pressure were 230° F. and 3-5 psig, respectively. The results are reported in terms of oxygen contained in the feedwater before and after treatment.

TABLE 13

| | 10% HQ/5% MOPA | 10% HQ/2% MOPA |
|---|---|---|
| Steam Load: | 10,000 lbs./hr. | 8,000 lbs./hrs. |
| Feedwater Dose: | 0.2 ppm as HQ | 0.2 ppm as HQ |
| | 0.1 ppm as MOPA | 0.04 ppm as MOPA |
| Feedwater $O_2$ in presence of HQ/MOPA | 0.6 ppb | 0.5 ppb |
| Feedwater $O_2$ in absence of HQ/MOPA | 16 ppb | 9.0 ppb |

EXAMPLE 13

Experiments were conducted to demonstrate the increase in aqueous hydroquinone solubility effected through the addition of mu-amines. Methoxypropylamine (MOPA), diethylaminoethanol (DEAE) and dimethylaminopropylamine (DMAPA) were the mu-amines used in the following procedure:

89.5 grams of demineralized water and 6.3 grams of hydroquinone were added to each of three beakers on magnetic stirring plates. The resulting solutions (#2, #2, and #3) were stirred until complete dissolution of hydroquinone was attained. Dissolution times for solutions #1, #2, and #3 were 23, 19, and 21 minutes, respectively. This resulted in three aqueous hydroquinone solutions with concentrations of 6.6% (by weight). The accepted literature value for aqueous hydroquinone solubility at 25° C. is ca.7%, so that solutions #1, #2, and #3 are seen to be very close to saturation with respect to hydroquinone.

3.7 grams of hydroquinone were added to each of the nearsaturated solutions and stirred for 46 minutes to ensure total saturation. After stirring, each of the three solutions was observed to contain undissolved hydroquinone.

The mu-amines MOPA, DEAE, and DMAPA were added dropwise to solutions #1, #2 and #3, respectively, until the undissolved hydroquinone went into solution. Volumes of mu-amines required to effect dissolution were recorded and converted to weights via density. The addition of 1.7 grams MOPA, 2.4 grams DEAE, and 1.7 grams DMAPA to saturated solutions #1, #2, and #3, respectively, resulted in elevating the aqueous hydroquinone solubility from approximately 7% to 9.8–9.9%.

In an additional test, the solubility of hydroquinone (HQ) in neat MOPA was determined. The MOPA was added dropwise to 10.0 grams of hydroquinone until the HQ dissolved. This required 12.5 grams of MOPA which gave a HQ to MOPA weight ratio of about 1:1.3.

Having thus described my invention, I claim:

1. A method for reducing the amount of oxygen in oxygen-containing feedwater to a boiler which method comprises adding to said feedwater an effective amount for the purpose of a hydrazine-free treatment comprising a stable solution of hydroquinone and mu-amine.

2. A method according to claim 1, wherein said solution is an aqueous solution.

3. A method according to claim 2, wherein said treatment is added in an amount of from about 0.1 to about 100 parts per million parts of feedwater.

4. A method according to claim 3, wherein the ratio of hydroquinone to mu-amine is about 7:1 to 1:99 and the total concentration of hydroquinone in said solution is about 45% or less.

5. A method according to claim 4, wherein said feedwater has an alkaline pH.

6. A method according to claim 5, wherein said pH is 9 or greater.

7. A method according to claim 4, wherein said mu-amine is methoxypropylamine.

8. A method according to claim 4, wherein said mu-amine is aminomethylpropanol.

9. A method according to claim 2 or 4, wherein the total amount of hydroquinone in solution is about 5% to 30%.

10. A method according to claim 9, wherein the total amount of hydroquinone in solution is about 10% to 20%.

11. A method for reducing the amount of oxygen in an oxygen-containing aqueous medium, which method comprises adding to the aqueous medium an effective amount for the purpose of a hydrazine-free treatment comprising a stable solution of hydroquinone and mu-amine, said treatment being added in an amount of from about 0.01 to about 10,000 parts per million parts of aqueous medium, wherein the ratio of hydroquinone to mu-amine is about 1:1.3 or less, and wherein said aqueous medium is that of a water heating system.

12. A method for reducing the amount of oxygen in an oxygen-containing aqueous medium, which method comprises adding to the aqueous medium an effective amount for the purpose of a hydrazine-free treatment comprising a stable solution of hydroquinone and mu-amine, said treatment being added in an amount of from about 0.01 to about 10,000 parts per million parts of aqueous medium, wherein the ratio of hydroquinone to mu-amine is about 1:1.3 or less, and wherein said aqueous medium is condensed steam in a boiler condensate system.

13. A method according to claim 11 or 12, wherein said aqueous medium has an alkaline pH.

14. A method according to claim 13 wherein said pH is 9 or greater.

* * * * *